Patented Aug. 2, 1932

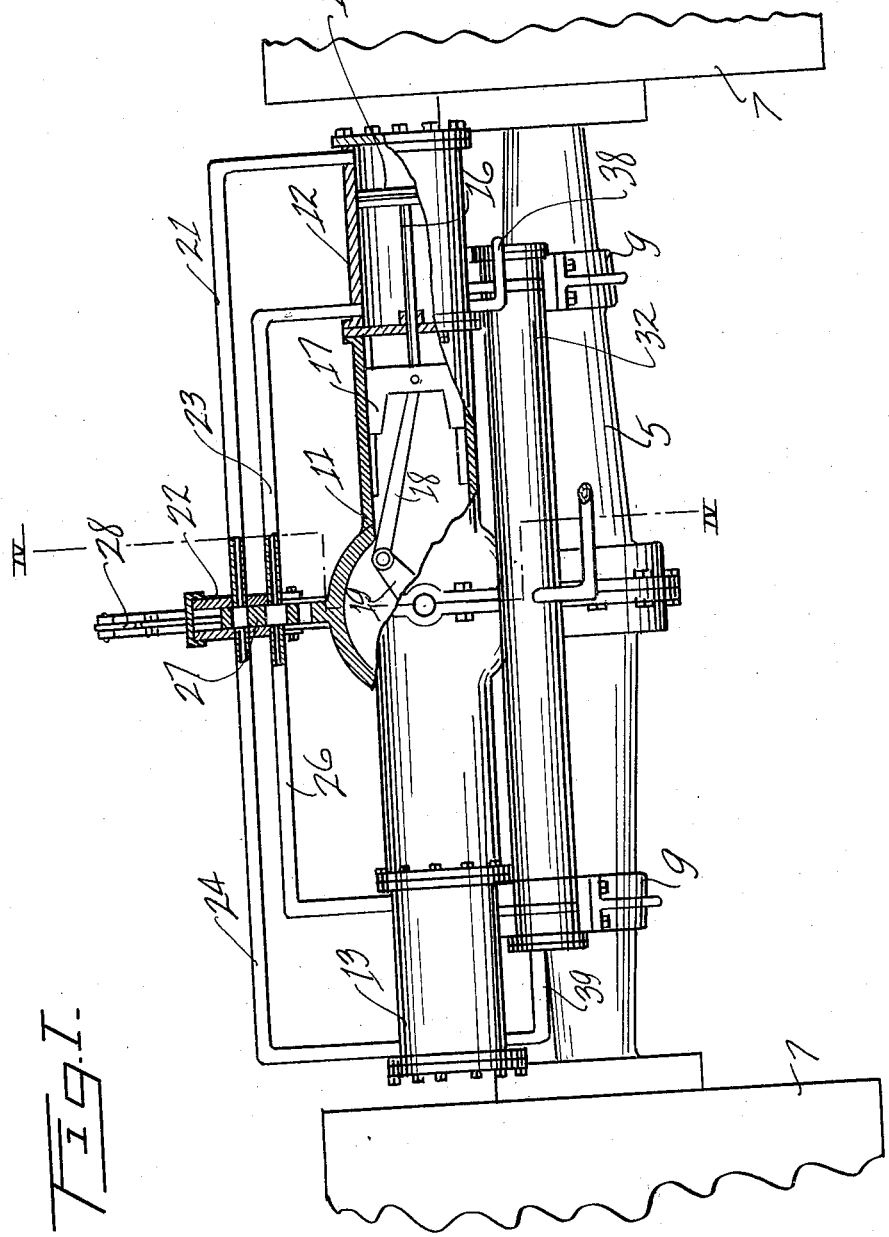

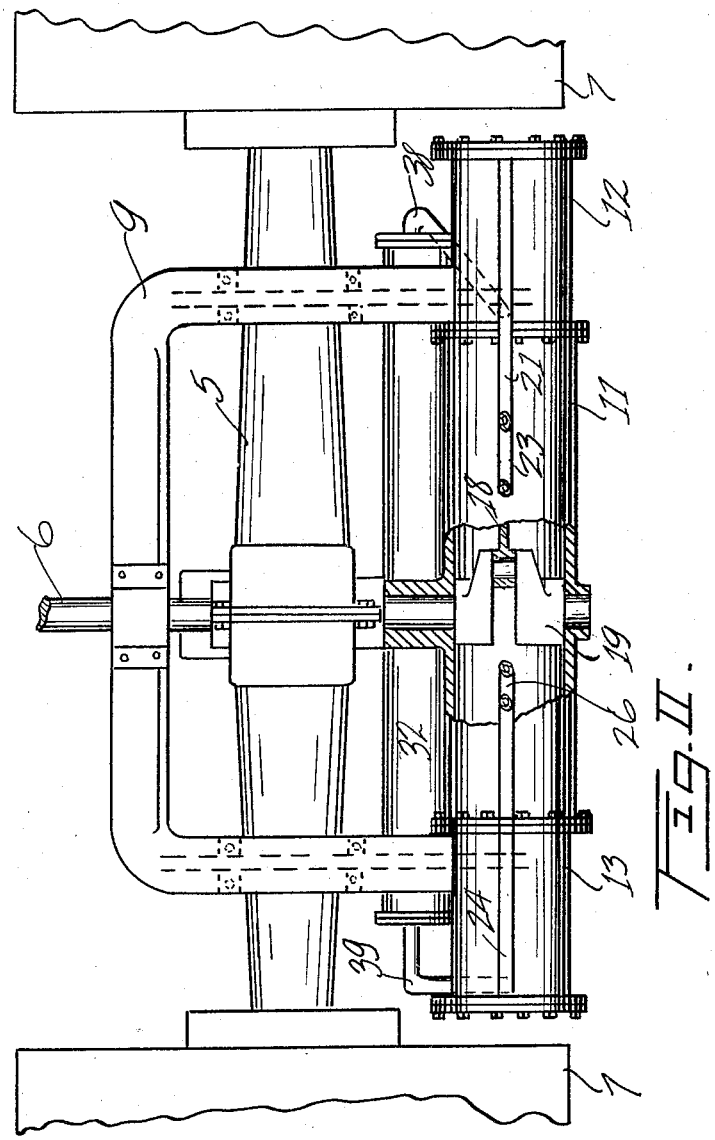

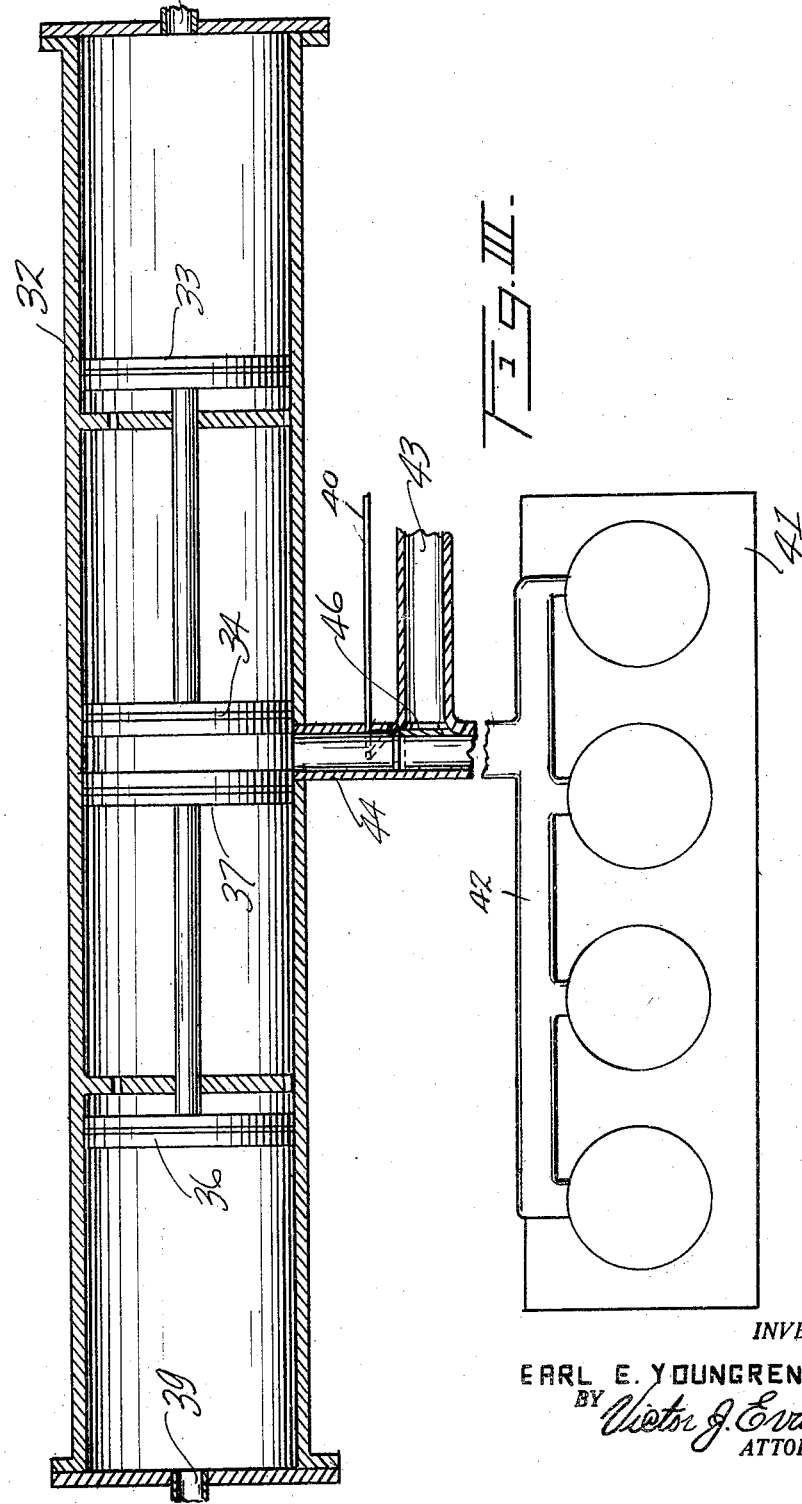

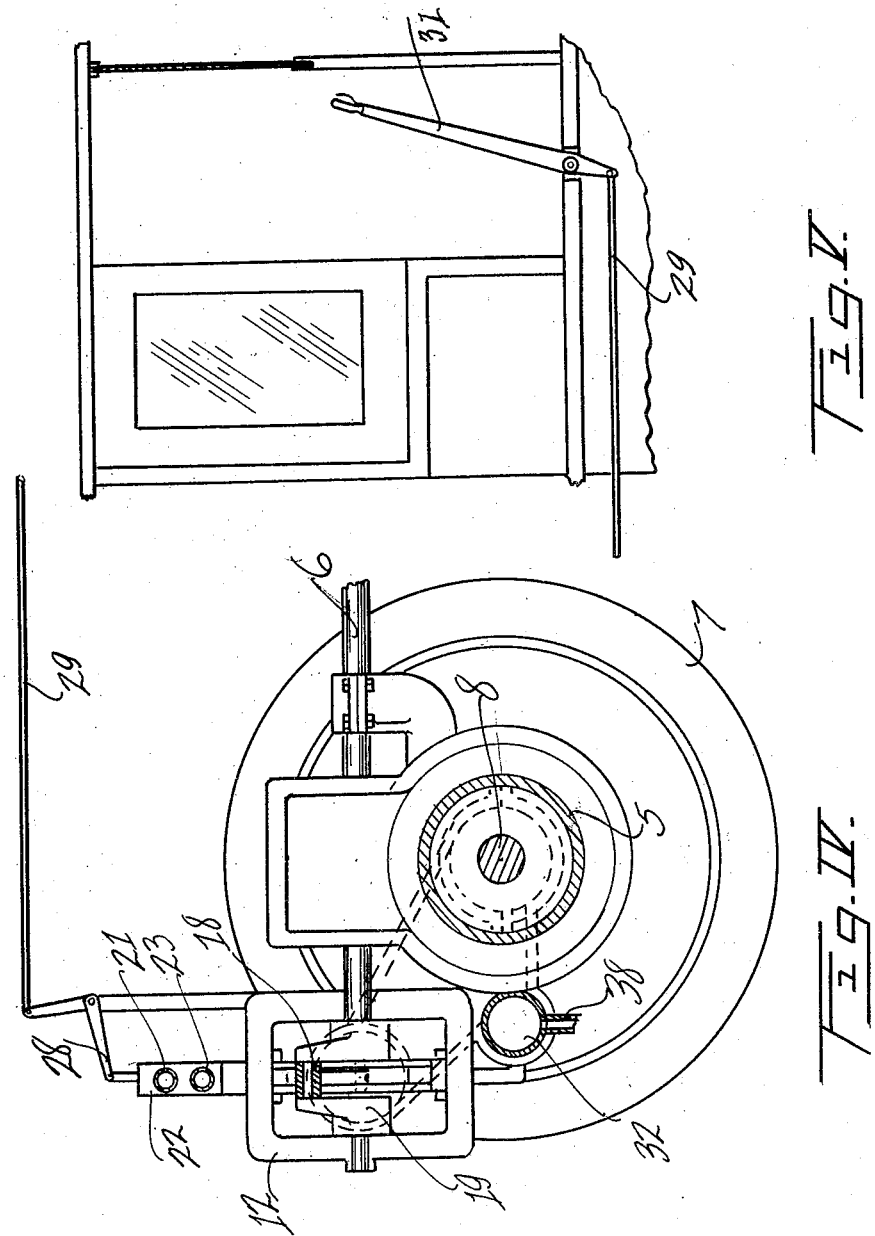

1,869,725

UNITED STATES PATENT OFFICE

EARL E. YOUNGREN, OF SAN FRANCISCO, CALIFORNIA

HYDRAULIC BRAKE

Application filed June 22, 1929, Serial No. 373,015. Renewed December 18, 1931.

This invention relates to improvements in hydraulic brakes.

The principal object of this invention is to provide means whereby a braking action may be applied to the rear wheels of a motor vehicle through hydraulic means, and one which will give an equal braking on both wheels.

Another object of the present invention is to produce a device which may be attached to any standard form of motor vehicle.

A further object is to provide means whereby the fluid used for braking is forced into the braking cylinders from a reservoir through the medium of the exhaust gases of the vehicle.

Other objects and advantages will be apparent during the course of the following description.

In the accompanying drawings forming a part of this specification, and in which like numerals are employed to designate like parts throughout the same, Figure I is a rear elevation of my device partly broken away and applied to the rear axle of a motor vehicle, Figure II is a top plan view of Figure I, Figure III is an enlarged detail cross-section of the reservoir and diagrammatically illustrating the means by which the fluid is moved outwardly therefrom, Figure IV is a vertical cross-section of an automobile rear axle having my device attached thereto, and taken on the line 4—4 of Figure I.

Figure V shows the control lever positioned within the cab of the vehicle.

It is my intention to brake the front or rearward movement of a motor vehicle by connecting to the drive shaft, in any suitable manner, as by a clutch or by direct connection, a double acting pumping arrangement whereby the opposite sides of the cylinders are connected in such a manner that as the pistons oscillate, fluid within the cylinders will be transferred from one cylinder to the other, and within these pipes I place valves for the purpose of controlling the flow of the fluid.

It is obvious that by closing down on the valves a retarding action will be effected upon the pistons. As they are in turn connected to the driving mechanism, the vehicle as a whole will be slowed down.

In the accompanying drawings wherein for the purpose of illustration is shown a preferred embodiment of my invention, the numeral 5 designates the rear axle housing of a motor vehicle of standard form having a propeller shaft 6 which shaft is adapted to drive the wheels 7 through the customary live axle 8. The construction thus far has no part of my invention and is only incidental thereto.

Through the medium of a suitable supporting frame 9 I support upon the axle, a casting 11 which is preferably made in two sections as shown to advantage in Figure I. This casting carries at its opposite ends cylinders 12 and 13 within which pistons 14 reciprocate, through the medium of a piston rod 16 which is connected to a cross head 17, which cross head is actuated by a crank arm 18, in turn connected to a crank 19, in turn connected to the shaft 6, either directly or through the medium of a clutch.

A pipe 21 connects to the outer end of the cylinder 12 and to a valve casing 22. A pipe 23 connects to the inner end of the cylinder 12 and to the valve casing 22. A pipe 24 connects to the outer end of the cylinder 13 and to the valve casing 22. A pipe 26 connects to the inner end of the cylinder 13 and to the valve casing 22. Within the valve casing is a slidable valve 27 having ports formed therein, which ports are adapted to be simultaneously moved into alignment with the ends of the pipes 21—24 and 23—26. The valve 27 is moved through the medium of a crank 28 (see Figures I and IV) which is actuated by a rod 29 connected to the hand lever 31 positioned in the cab (see Figure V).

In order to keep the cylinders 12 and 13 filled with oil to accommodate for leakage, I provide a cylindrical reservoir 32 which is also supported upon the frame 9 and has positioned therein a pair of floating pump dumbbell pistons having piston heads 33—34 and 36—37.

A pipe 38 connects one end of the reservoir 32 to the cylinder 12, while a pipe 39 connects the opposite end of the reservoir to the cylinder 13.

Referring now to Figure III, I have diagrammatically illustrated an engine at 41 having an exhaust manifold 42, the exhaust ordinarily passing out of the muffler pipe 43. To this muffler pipe I have connected a pipe 44 having a valve 46 therein, which valve may be actuated by a rod 40 so as to direct a portion of the exhaust pressure between the pistons 34 and 37, for the purpose of pushing them apart and thus forcing additional oil into the cylinders 12 and 13. The rod 40 extends to a point near the driver and is actuated by him whenever he feels that the braking effect is insufficient and that more oil is needed in the braking mechanism. The operation of my device is as follows:—

Assuming that the device is attached to a motor vehicle and the vehicle is proceeding along the highway should the operator wish to slow down, he operates the lever 31 which may be in the form of a foot pedal or any other convenient means thus moving the valve 27 so as to shut off the flow between the pipes 21—24, 23—26 and as the pistons 14 in the cylinders 12 and 13 are being actuated, it will be apparent that the closing off of the flow of fluid from the opposite sides of the pistons will cause both a back pressure and a vacuum which will retard the rotation of the shaft 6 and consequently, the wheels 7 connected therewith. By closing the valve entirely, it will be possible to completely lock the movement of the wheels.

It will thus be seen that I have provided simple means for accomplishing the objects herein set forth.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:—

In a braking mechanism for motor vehicles having a rear axle assembly and including a driving shaft, a crank interposed between said cylinders, and adaptedly rotated by said driving shaft, pistons mounted in each of said cylinders, connecting rods connecting said pistons and said crank, pipes connecting the opposite ends of each of said cylinders to each other, a valve interposed in said pipes, means for actuating said valve to release the flow into said pipes, a reservoir positioned adjacent said cylinder, a pipe extending from said reservoir to one end of one of said cylinders, a pipe extending from the opposite end of said reservoir to the other of said cylinders, pistons mounted in said reservoir, and fluid means for moving said pistons away from each other for the purpose of injecting fluid into each of said cylinders from said reservoir.

In testimony whereof I affix my signature.

EARL E. YOUNGREN.